(12) United States Patent
Ota

(10) Patent No.: US 9,114,746 B2
(45) Date of Patent: Aug. 25, 2015

(54) VEHICLE SEAT

(71) Applicant: TOYOTA BOSHOKU KABUSHIKI KAISHA, Aichi-ken (JP)

(72) Inventor: Hiroki Ota, Inazawa (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 231 days.

(21) Appl. No.: 13/669,621

(22) Filed: Nov. 6, 2012

(65) Prior Publication Data

US 2013/0113265 A1  May 9, 2013

(30) Foreign Application Priority Data

Nov. 8, 2011 (JP) ................................ 2011-244507

(51) Int. Cl.
*B60N 2/56* (2006.01)
(52) U.S. Cl.
CPC ..................................... *B60N 2/5657* (2013.01)
(58) Field of Classification Search
CPC ... B60N 2/5657; B60N 2/5642; B60N 2/5875
USPC ................ 297/180.12, 180.13, 180.14, 180.1
See application file for complete search history.

(56) References Cited

U.S. PATENT DOCUMENTS

| | | | | |
|---|---|---|---|---|
| 662,647 | A * | 11/1900 | Howe ............................. | 160/179 |
| 3,126,229 | A * | 3/1964 | Dickerson ................. | 297/452.55 |
| 4,670,072 | A * | 6/1987 | Pastor et al. .................. | 156/73.1 |
| 5,405,178 | A * | 4/1995 | Weingartner et al. .... | 297/452.48 |
| 6,158,815 | A * | 12/2000 | Sugie et al. ............... | 297/452.61 |
| 6,233,896 | B1 * | 5/2001 | Coup ........................... | 52/586.1 |
| 6,511,562 | B1 * | 1/2003 | Coffield ........................... | 156/66 |
| 6,786,541 | B2 * | 9/2004 | Haupt et al. ................ | 297/180.1 |
| 7,475,464 | B2 * | 1/2009 | Lofy et al. ..................... | 29/91.1 |
| 7,478,869 | B2 * | 1/2009 | Lazanja et al. ........... | 297/180.14 |
| 7,971,931 | B2 * | 7/2011 | Lazanja et al. ........... | 297/180.14 |
| 8,118,362 | B2 * | 2/2012 | Nishimura et al. ........ | 297/217.3 |

(Continued)

FOREIGN PATENT DOCUMENTS

| JP | 2000-310284 | 11/2000 |
|---|---|---|
| JP | 2003-235676 | 8/2003 |

(Continued)

OTHER PUBLICATIONS

Machine Translation of JP 2003-253676, date pulled Sep. 5, 2014, p. 1-6.*
Japanese Official Action for JP App. No. 2011-244507 dated Mar. 3, 2015, along with an English-language translation thereof.

*Primary Examiner* — Elizabeth A Plummer
(74) *Attorney, Agent, or Firm* — Greenblum & Bernstein, P.L.C.

(57) ABSTRACT

A vehicle seat including a seat structure member, and a fan device installed on the seat structure member is provided. The seat structure member may include a cushion material which configures an outer shape of the seat and supports an occupant, an air flow passage which communicates a seating side of the seat structure member with a surface of the cushion material at a side different from the seating side of the seat structure member, and a cover member which is configured to cover the air flow passage to allow a fan device to feed air to an occupant via the air flow passage. The cushion material and the cover member may be provided with a recess portion which is positioned around the air flow passage, and the cover member is fixed to the surface of the cushion material with an adhesive in the recess portion.

5 Claims, 5 Drawing Sheets

(56) References Cited

U.S. PATENT DOCUMENTS

| | | | | |
|---|---|---|---|---|
| 2004/0090093 | A1* | 5/2004 | Kamiya et al. | 297/180.14 |
| 2006/0284455 | A1* | 12/2006 | Terech | 297/180.14 |
| 2007/0107440 | A1* | 5/2007 | Ito et al. | 62/3.2 |
| 2009/0134675 | A1* | 5/2009 | Pfahler | 297/180.1 |

FOREIGN PATENT DOCUMENTS

| | | |
|---|---|---|
| JP | 2007-307232 | 11/2007 |
| JP | 2010-201825 | 9/2010 |
| JP | 2011-130977 | 7/2011 |

* cited by examiner

VEHICLE SEAT

BACKGROUND OF THE INVENTION

1. Field of the Invention

The present invention relates to a vehicle seat including a cushion material configuring an outer shape of the seat, an air flow passage formed in the cushion material, through which air of a fan device passes, and a cover member for covering the air flow passage.

2. Description of the Related Art

JP-A-2003-235676 discloses a vehicle seat which includes a seat cushion, a seatback, and a fan device. The fan device has a centrifugal type blower (mechanism for suctioning outer air in an axial direction from the device and blowing it in a centrifugal direction).

The seatback has a cushion material configuring an outer shape of the seat, an air flow passage formed in the cushion material, a cover member, and a skin material made of cloth. The cushion material is a member for resiliently supporting an occupant and may be made of polyurethane foam or the like.

The air flow passage has a groove and ventilation holes (see FIG. 6 of JP-A-2003-235676). The groove is a recessed portion (substantially H-shape when seen from a front) formed in a rear surface of the cushion material. The ventilation hole is a passage in the cushion material, and communicates the rear surface of the cushion material with the groove.

The cover member is a flat plate member (flat) which is capable of covering the air flow passage, and has a hole (through-hole) at a position opposing the groove.

According to a related-art technique, after an adhesive is applied to the rear surface (around the groove) of the cushion material, the cover member is fixed with an adhesive to cover the air flow passage. The fan device is installed in the seatback, and is communicated with the air flow passage via the hole of the cover member. In this way, the air discharged from the fan device can be fed to the seating side via the air flow passage of the cushion material.

In this technique, the flat cover member is fixed to the cushion material using the adhesive. In the case where the cover member is fixed using the adhesive, however, if a force is applied to the cover member in a plane direction (if a force is applied in a shear direction), there is a concern that the cover member is displaced in the plane direction with respect to the cushion material, and is thus slipped out from the cushion material.

It may be possible to fix the cover member to the cushion material using a bolt member, however, if so, the number of components is increased.

SUMMARY OF THE INVENTION

The present invention has been made in view of the above circumstances, and an object of the present invention is to fix a cover member to a cushion material with an adhesive in a relatively strong manner, without increasing the number of seat components as possible.

According to an illustrative embodiment of the present invention, there is provided a vehicle seat comprising: a seat structure member which is one of a seat cushion, a seatback, a headrest and an armrest; and a fan device installed on the seat structure member. The seat structure member includes: a cushion material which configures an outer shape of the seat and is configured to resiliently support an occupant; an air flow passage which communicates a seating side of the seat structure member with a surface of the cushion material at a side different from the seating side of the seat structure member; and a cover member which is configured to cover the air flow passage.

In the above configuration, the cover member is adhesively fixed to the surface of the cushion material while covering the air flow passage, and allows the air flow passage to communicate with the fan device to feed air discharged from the fan device to an occupant via the air flow passage. In the configuration of the seat, it is advantageous to fix the cover member to the cushion material in a relatively strong manner, without increasing the number of components as possible.

Therefore, according to the illustrative embodiment, at least one of the cushion material and the cover member is formed with a recess portion which is positioned around the air flow passage, and the cover member is fixed to the surface of the cushion material with an adhesive in the recess portion.

According to this configuration, the adhesive is solidified in the recess portion (for example, solidified in the shape of a bolt), so that the cover member can be adhesively fixed to the cushion material in the relatively strong manner.

In the above vehicle seat, the cushion material may be made of foamed resin and formed with the recess portion, and at least the recess portion may be covered by a rear surface material made of cloth, and when the cushion material is formed, a foamed resin raw material may be impregnated in the rear surface material, so that the recess portion is integrated with the rear surface material to be covered.

According to this configuration, the rear surface material is cured by the impregnation of the foamed resin raw material of the cushion material. The adhesive is held on the rear surface material (relatively hard member), so that adhering reliability of the cover member to the cushion material can be improved.

In the above vehicle seat, the recess portion may be provided with a locking portion to restrict a relative movement of the adhesive with respect to the recess portion in a releasing direction.

According to this configuration, releasing of the adhesive is prevented or reduced by the locking portion, thereby further improving the attaching reliability of the cover member to the cushion material.

BRIEF DESCRIPTION OF THE DRAWINGS

In the accompanying drawings:

FIG. 4A is a cross-sectional view of the cover member and a cushion material prior to attachment, FIG. 4B is a cross-sectional view of the cushion material and the cover member to which an adhesive is applied, and FIG. 4C is a cross-sectional view of the cover member and the cushion material after attachment; FIG. 5A is a cross-sectional view of the cover member and a cushion material prior to attachment, FIG. 5B is a cross-sectional view of the cushion material and the cover member to which an adhesive is applied, and FIG. 5C is a cross-sectional view of the cover member and the cushion material after attachment.

DETAILED DESCRIPTION

First Illustrative Embodiment

Figure 1:
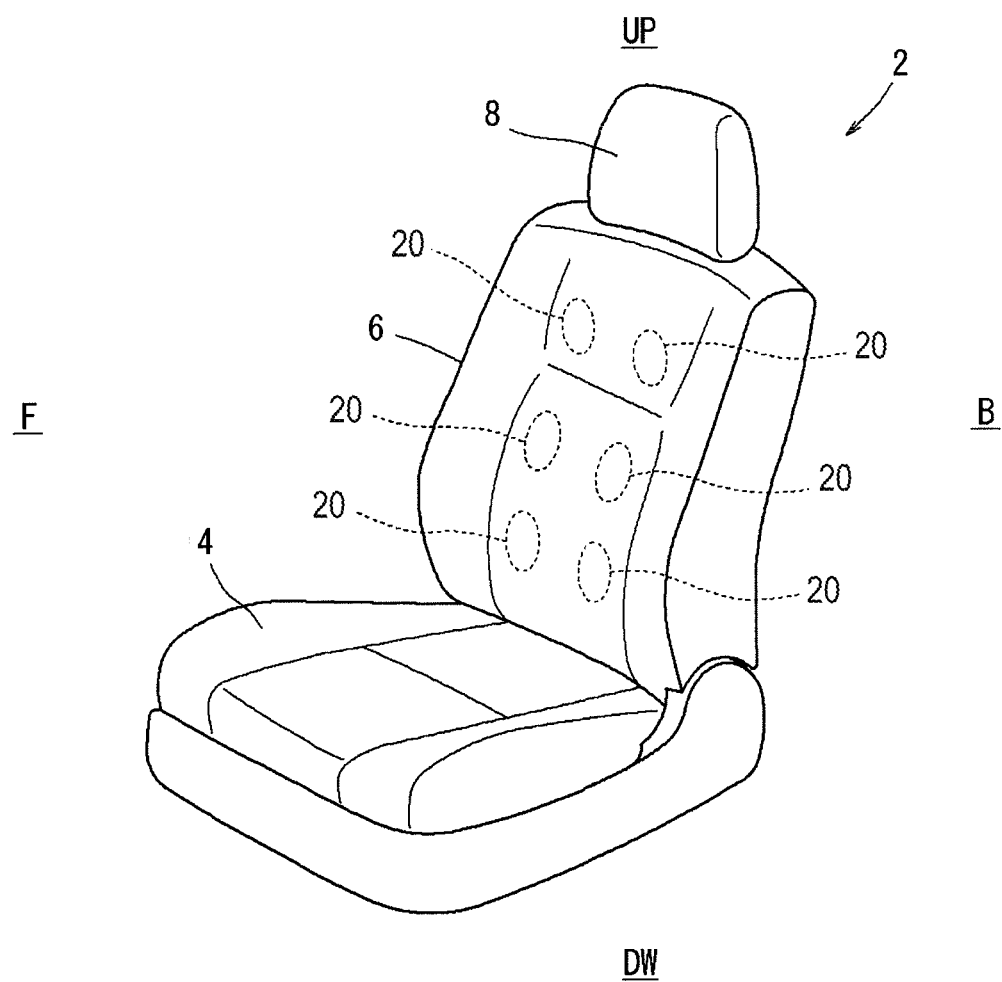
FIG. 1 is a perspective view showing a vehicle seat.
Figure 2:
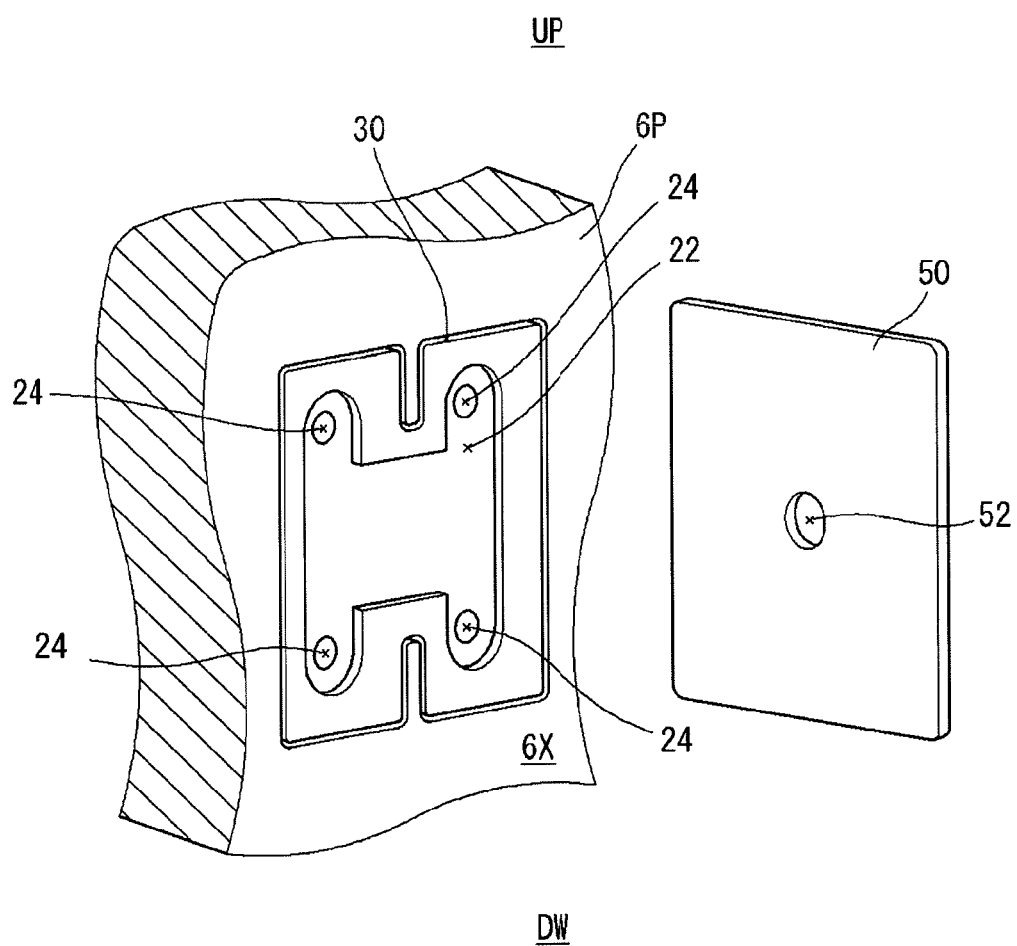
FIG. 2 is a partially exploded perspective view of a cushion material.

Hereinafter, an illustrative embodiment according to the present invention will be described with reference to FIGS. 1 to 4. In each drawing, a front side of a vehicle seat is designated by a reference numeral F, a rear side of the vehicle seat is designated by a reference numeral B, an upper side of the vehicle seat is designated by a reference numeral UP, and a lower side of the vehicle seat is designated by a reference numeral DW.

A vehicle seat 2 shown in FIG. 1 includes a seat cushion 4, a seatback 6, and a headrest 8. These seat structure members have frame members 4F, 6F and 8F for configuring a seat framework, cushion materials 4P, 6P and 8P for configuring an outer shape of the seat, and skin materials 4S, 6S and 8S for covering the cushion materials, respectively.

[Seatback]

The seatback 6 includes the above-described configurations 4F, 4P and 4S, a fan device 10, an air flow passage 20 (recess portion 30), and a cover member 50. Each element will be described in detail later with reference to FIGS. 1 to 3.

In this illustrative embodiment, as the fan device 10 is installed to the seatback 6, the fan device 10 is communicated with the air flow passage 20 and the cover member 50 which will be described later. As a result, outer air can be fed to the fan device 10 within the seatback 6, and the air discharged from the fan device 10 can be sent to an occupant.

The cover member 50 covers the air flow passage 20 while the cover member is fixed to the cushion material 6P with an adhesive. In this configuration, it is advantageous to fix the cover member 50 to the cushion material 6P in a relatively strong manner, without increasing the number of components as possible.

With this illustrative embodiment, the cover member 50 is fixed to the cushion material 6P in the relatively strong manner by the configuration which will be described later, without increasing the number of seat components as much as possible. Each configuration will be described in detail later.

[Fan Device]

Figure 3:
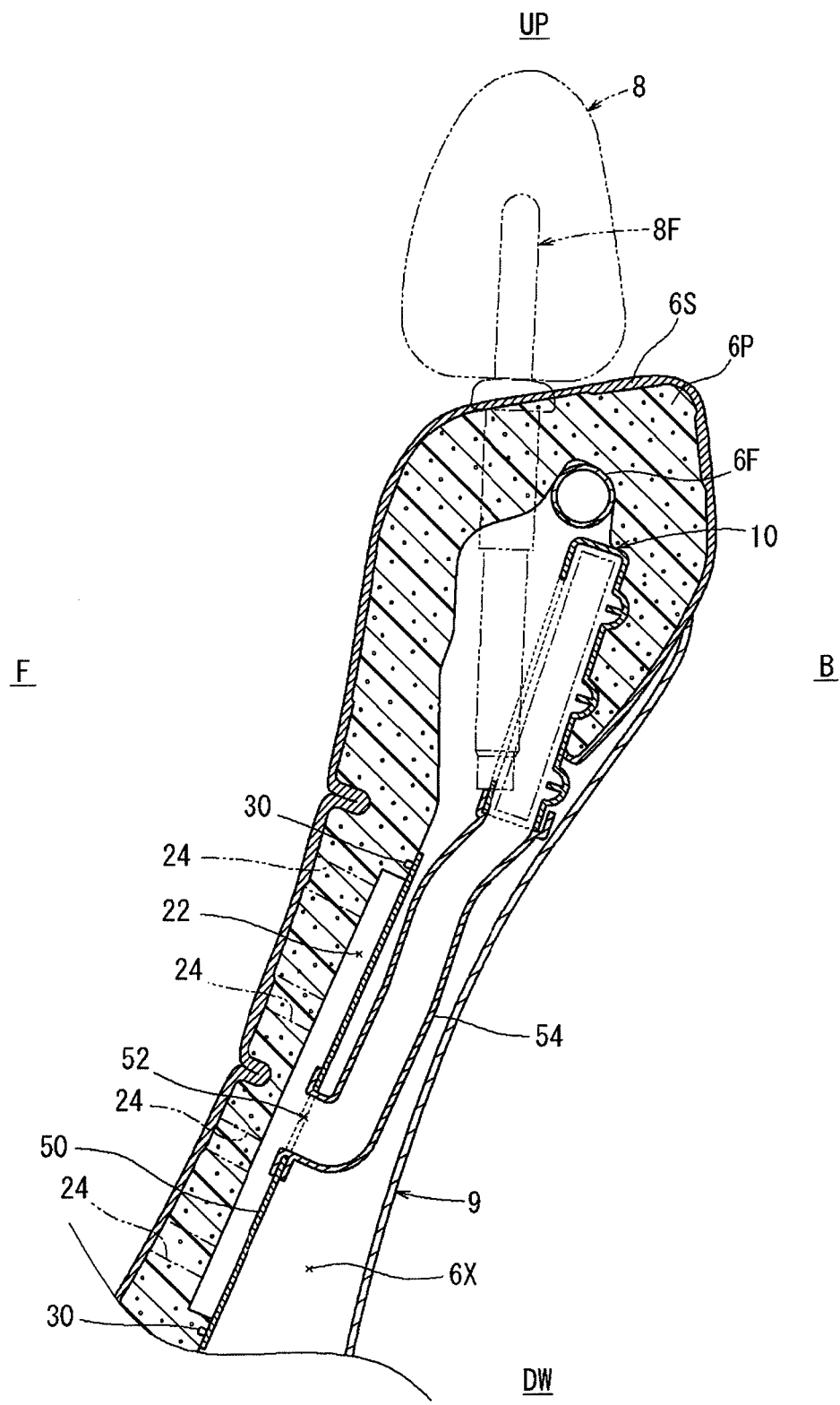
FIG. 3 is a cross-sectional view showing a portion of a seatback.

The fan device 10 of this illustrative embodiment is formed in the shape of a hollow box (short tube shape) and incorporates a fan mechanism therein (see FIG. 3).

As the fan mechanism, for example, a centrifugal type blower (mechanism for suctioning outer air in an axial direction from the device and blowing it in a centrifugal direction) may be employed. The fan mechanism may be, for example, a multi-blade fan (sirocco fan), a plate fan, a turbo fan, a blade type fan, and a limited load fan.

[Basic Configuration]

The frame member 6F is a substantially rectangular frame body, and can support the cushion material 6P (see FIGS. 1 and 3). Also, the skin material 6S is a bag shaped member having permeability, and can be made of cloth (woven fabric, knit, or nonwoven fabric), perforated leather (natural leather or synthetic leather) or the like.

The cushion material 6P is a substantially rectangular member configuring an outer shape of the seat, and has a receiving portion 6X and other configurations (the air flow passage 20, the recess portion 30, a rear surface member 30, and the cover member 50) which will be described later. The material of the cushion material 6P is not specifically limited, but one example is polyurethane foam (density: 10 kg/m3 to 60 kg/m3).

The cushion material 6P (stand-up state) of this illustrative embodiment has an end portion (upper end portion, lower end portion or the like) which is bent toward the rear side of the seat. The center portion of the cushion material 6P is provided with a recess portion (receiving portion 6X) which is recessed toward a seating side rather than the end portion, thereby accommodating the fan device 10. The rear side (receiving portion 6X) of the cushion material 6P is covered by a board member 9 (made of resin).

[Air Flow Passage]

The air flow passage 20 is a channel for guiding an air discharged from the fan device 10 to the seating side, and has a groove 22 and a plurality of holes 24 (see FIGS. 2, 3 and 4A-C).

The groove 22 is a recessed part having a substantially H-shape when seen from a front, and can be formed in the rear surface of the cushion material. Each of the plurality of holes 24 is a through-hole penetrating the cushion material 6P in a thickness direction. One end of each hole 24 is opened toward the seating side, while the other end is opened toward the groove 22.

[Recess Portion]

The recess portion 30 is the recess in the rear surface (around the air flow passage 20) of the cushion material 6P (see FIGS. 3 and 4A-C).

In this illustrative embodiment, the recess portion 30 (substantially rectangular space when seen from a cross section) is continuously formed around the groove 22. In this way, the recess portion 30 is formed in the substantially H-shape (when seen from the front) larger than the groove 22. A depth size of the recess portion 30 is not specifically limited, but can be typically set to be shallower than the groove 22.

[Rear Surface Material]

Figure 4A:
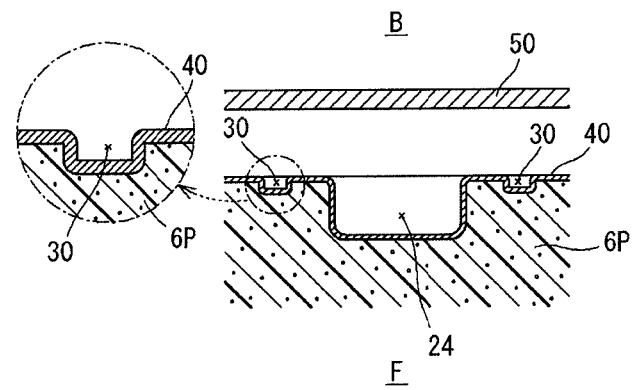
FIGS. 4A to 4C are views showing a process of attaching a cover member according to a first illustrative embodiment, where
Figure 4B:
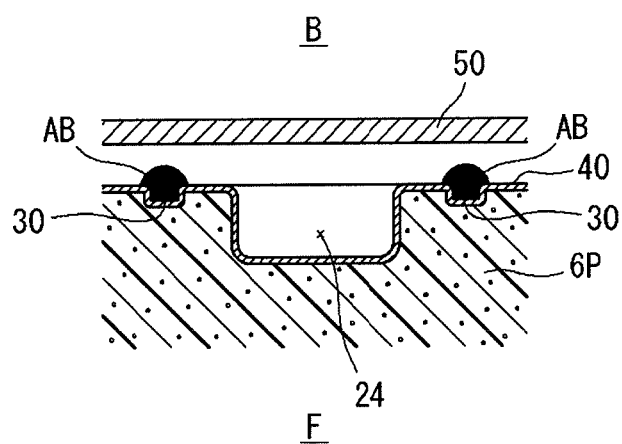
Figure 4C:
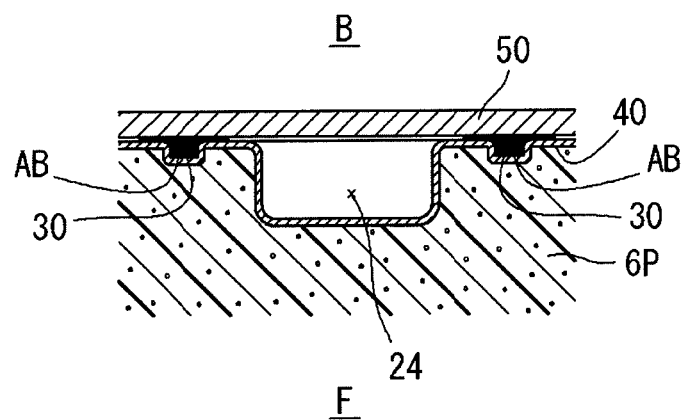

The rear surface material 40 is a planar member which is capable of reinforcing the cushion material 6P (recess portion 30), and can be provided on the rear surface of the cushion material 6P (see FIGS. 4A-C).

The material of the rear surface material 40 is not specifically limited, but the material generally has a stretch property which is lower than that of the cushion material 6P. One example of the rear surface material 40 is cloth (woven fabric, knit, or nonwoven fabric) as a fiber layer, and leather as a resin layer (natural leather or synthetic leather). The rear surface material 40 made of the cloth is advantageous since the raw materials of the foamed resin of the cushion material 6P have a superior impregnating ability. Among them, spunbonded nonwoven fabric (trade name: TAFNEL; commercially available from Mitsui Chemicals Inc.) can be appropriately utilized as the rear surface material 40.

The method of providing the rear surface material 40 is not specifically limited. For example, the rear surface material 40 can be attached to the rear surface of the cushion material 6P (after molding). Alternatively, the rear surface material 40 can be attached at the time of molding the cushion material 6P.

In this illustrative embodiment, when the cushion material 6P is molded, the rear surface material 40 (made of cloth) is disposed in a cavity of a shaping die (not shown). By introducing the foamed resin raw material (molten resin or the like) into the shaping die, the rear surface material 40 is attached while the cushion material 6P is molded. For example, polyol and isocyanate can be used as the foamed resin raw material.

Also, in this illustrative embodiment, as the foamed resin raw material which is not formed yet or is forming is penetrated (impregnated) and solidified, the rear surface material 40 is integrated in the rear surface of the cushion material 6P.

The rear surface material 40 is cured by the impregnation of the foamed resin raw material of the cushion material 6P. In this way, by holding an adhesive AB on the rear surface material 40 (relatively hard member), the adhering reliability of the cover member 50 to the cushion material 6P can be improved.

[Cover Member]

The cover member 50 is a flat plate member of a substantially rectangular shape (when seen from the front) which can cover the groove 22, and has a communication hole 52 (see FIGS. 2, 3 and 4A-C). The cover member 50 (material) is not specifically limited, but can be generally made of a non-air-permeable or low-air-permeable material (resin, cloth, leather or the like).

The communication hole 52 is a through-hole provided at a center part of the cover member 50, and can communicate with the fan device 10 via a duct member 54.

In this illustrative embodiment, by appropriately adjusting external dimensions of the cover member 50, the cover member can be fixed to the rear surface (receiving portion 6X) of the cushion material 6P while covering both the air flow passage 20 and the recess portion 30.

[Adhesive]

The adhesive AB is a chemical composition for fixing the cushion material 6P and the cover member 50 (see FIGS. 3 and 4A-C).

An example of the adhesive AB includes an inorganic adhesive such as cement or ceramic, a natural adhesive such as natural rubber or starch, a half-synthetic adhesive such as cellulose nitrate, a resin adhesive such as thermoplastic resin or thermosetting resin, a rubber-resin adhesive such as chloroprene rubber or nitrile rubber, and a composite adhesive such as elastomer.

Among them, the resin adhesive is advantageous since it has superior strength of adhesive bonding. An example of the thermoplastic resin (so-called hot melt adhesive) includes polyamide resin, polyurethane resin, polyester resin, and ethylene-vinyl acetate copolymer (EVA resin). Also, an example of the thermosetting resin includes epoxy resin, polyaromatic resin, urea resin, melamine resin, phenol resin, resorcinol resin, and ester resin.

[Attaching Operation of Cover Member]

Referring to FIGS. 2, 3 and 4A-C, the cushion material 6P is disposed on the frame member 6F, and the cover member 50 is fixed to the rear surface of the cushion material 6P with the adhesive AB.

In this illustrative embodiment, the adhesive AB is introduced into the recess portion 30 (using the recess portion as a mark). In the state where the recess portion 60 is heaped with the adhesive AB, the cover member 50 is overlapped on the rear surface of the cushion material 6P and then is adhesively fixed thereto, thereby covering the air flow passage 20 (see FIGS. 4A-C).

A relative movement of the cover member 50 with respect to the cushion material 6P in the shear direction (plane direction) is restricted by the adhesive AB solidified in the recess portion 30 (by the adhesive AB solidified in the shape of a bolt), so that the cover member can be more strongly held.

Also, the reliability of the cover member 50 attached to the cushion material 6P can be improved by holding the adhesive AB on the rear surface (relatively hard member).

[Installing Operation of Fan Device]

Referring to FIG. 3, the fan device 10 is disposed in the receiving portion 6X, and is fixed to the frame member 6F.

The fan device 10 can be communicated with the air flow passage 20 by connecting the duct member 54 to the cover member 50 (communication hole 52) via the duct member 54. The seatback 6 can be formed by covering the cushion material 6P with the skin material 6S and then installing the board member 9 to the rear surface.

The air flow passage 20 is communicated with the fan device 10, so that the air discharged from the fan device 10 can be fed to the occupant via the air flow passage 20.

As described above, according to the illustrative embodiment, the cushion material 6P is formed with the recess portion 30, and the cover member 50 is fixed to the rear surface of the cushion material 6P with the adhesive AB in the recess portion 30. The relative movement of the cover member 50 with respect to the cushion material 6P in the shear direction (plane direction) is restricted by the adhesive AB solidified in the shape of the bolt.

Also, in this illustrative embodiment, the adhering reliability of the cover member 50 to the cushion material 6P can be improved by holding the adhesive AB on the rear surface material 40 (relatively hard member) in the recess portion 30.

For this reason, according to this illustrative embodiment, the cover member 50 can be fixed to the cushion material 6P with an adhesive in a relatively strong manner, without increasing the number of seat components as possible.

Second Illustrative Embodiment

Since a vehicle seat of a second illustrative embodiment has the substantially same configuration as that of the vehicle seat 2 according to the first illustrative embodiment, common structures are denoted by the same reference numerals, and a detailed description thereof will be omitted herein.

Figure 5A:
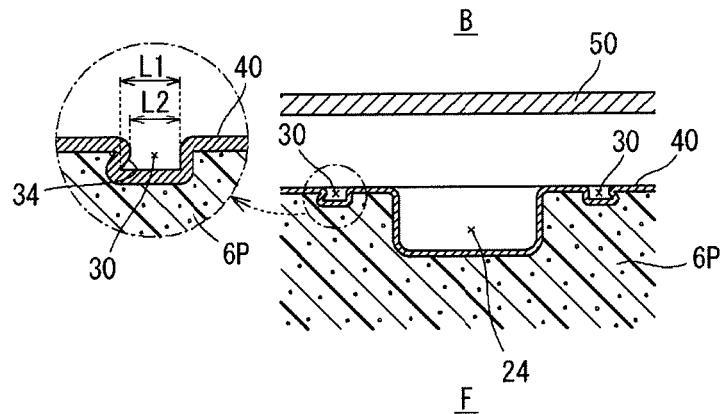
FIGS. 5A to 5C are views showing a process of attaching a cover member according to a second illustrative embodiment, where
Figure 5B:
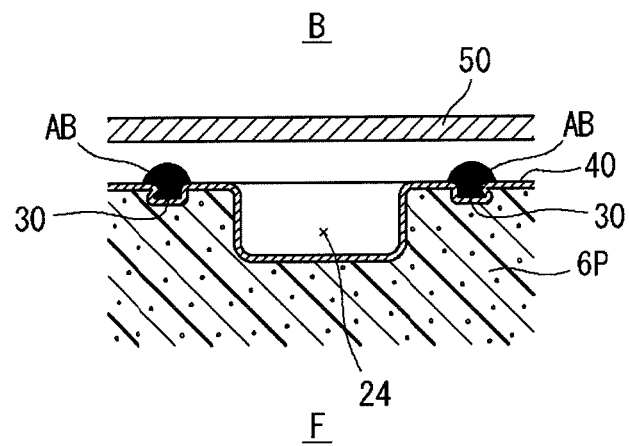
Figure 5C:
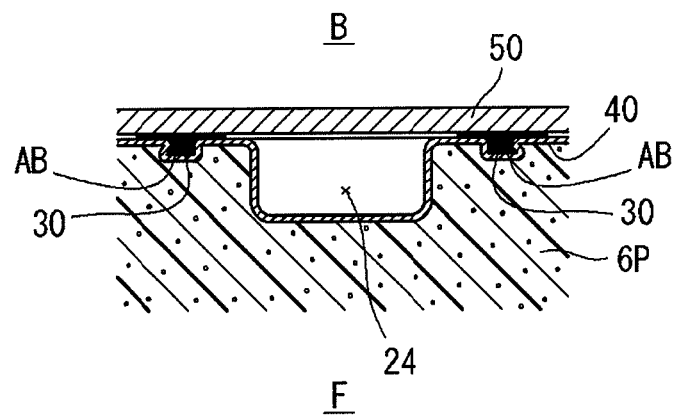

A recess portion 30 of this illustrative embodiment is formed in the rear surface (around the air flow passage 20) of a cushion material 6P, and has a locking portion 34 (see FIGS. 5A-C).

The locking portion 34 is configured to prevent an adhesive AB (cured state) from being released from the recess portion 30. In this illustrative embodiment, an inner width dimension L1 of the recess portion 30 at a bottom part thereof is set to be larger than an opening width dimension L2 of the recess portion 30 at an opening part thereof, so that an opening edge of the recess portion 30 protrudes in a peaked shape (forms the locking portion 34 of the peaked shape).

The locking portion 34 may be formed on at least one of the opening edge apart from a groove 22, the opening edge close to the groove 22, and the edge portion connecting both edges. In this instance, when the locking portion 34 is formed on the opening edge apart from the groove 22, it is possible to appropriately prevent an adhesive AB from being released from the recess portion 30.

A relative movement of a cover member 50 with respect to the cushion material 6P in a shear direction (plane direction) is restricted by the adhesive AB solidified in the recess portion 30. In this instance, a relative movement of the adhesive AB (cured state) with respect to the recess portion 30 in a releasing direction can be restricted by the locking portion 34 (peaked shape).

According to this illustrative embodiment, releasing of the adhesive AB is prevented or reduced by the locking portion 34, thereby further improving the attaching reliability of the cover member 50 to the cushion material 6P.

While the present invention has been shown and described with reference to certain illustrative embodiments thereof, it will be understood by those skilled in the art that various changes in form and details may be made therein without departing from the spirit and scope of the invention as defined by the appended claims.

(1) Although one example of continuously forming the recess portion 30 has been described in this illustrative embodiment, it does not intend to limit the configuration (formation number, shape or the like) of the recess portion 30.

For example, a recess portion of a dot shape may be formed around the groove (formed in a non-continuous shape).

(2) One example of providing the recess portion 30 in the cushion material 6P has been described in this illustrative embodiment. However, the recess portion may be provided in at least one of the cushion material and the cover member. Also, the cover member may be provided with a recess portion which has a non-through recessed section or a recess portion which has a section penetrating the cover member in the thickness direction.

(3) Although one example of providing the rear surface material 40 on the cushion material 6P has been described in this illustrative embodiment, the rear surface material may be omitted.

(4) One example of attaching the rear surface material 40 to the substantially whole surface of the rear surface of the cushion material 6P has been described in this illustrative embodiment. Alternatively, the rear surface material may be attached to the recess portion only.

(5) Although the configuration of the recess portion 30 has been described as one example of the seat back 6 in this illustrative embodiment, the recess portion may be formed in various kinds of seat structure members, for example, the seat cushion 4, the headrest 8 or an armrest.

What is claimed is:

1. A vehicle seat comprising:
   a seat structure member which is one of a seat cushion, a seatback, a headrest and an armrest; and
   a fan device installed on the seat structure member,
   wherein the seat structure member includes:
      a cushion material which configures an outer shape of the one of the seat cushion, the seatback, the headrest and the armrest and is configured to resiliently support an occupant;
      an air flow passage which communicates a seating side of the seat structure member with a surface of the cushion material at a side different from the seating side of the seat structure member; and
      a cover member which is configured to cover the air flow passage from the surface of the cushion material at the side different from the seating side of the seat structure member,
   wherein the cover member is adhesively fixed to the surface of the cushion material while covering the air flow passage, and allows the air flow passage to communicate with the fan device to feed air discharged from the fan device to an occupant via the air flow passage,
   wherein the cushion material is a foamed resin and provided with a recess portion which is positioned around the air flow passage, the cover member is fixed to the surface of the cushion material with an adhesive in the recess portion, and at least the recess portion is covered by a rear surface material made of cloth, and
   wherein the foamed resin of the cushion material is impregnated within the rear surface material such that the rear surface material is adhered to the cushion material.

2. The vehicle seat according to claim 1,
   wherein the recess portion is provided with a locking portion to restrict a relative movement of the adhesive with respect to the recess portion in a releasing direction.

3. The vehicle seat according to claim 1,
   wherein the recess portion includes an opening part and a bottom part, and
   wherein the recess portion includes a locking portion which protrudes from the bottom part such that a width of the bottom part is larger than that of the opening part.

4. The vehicle seat according to claim 3,
   wherein the opening part of the recess portion has a first opening edge which is provided at a side closer to the air flow passage than a second opening edge which is provided at a side further away from the air flow passage,
   wherein the locking portion is provided at the second opening edge of the recess portion.

5. A seat structure member comprising:
   a cushion material which configures an outer shape of a vehicle seat and is configured to resiliently support an occupant;
   an air flow passage which is formed in the cushion material to communicate a seating side of the seat structure member with a surface of the cushion material at a side of the seat structure member opposite to the seating side; and
   a cover member which is configured to cover the air flow passage from the surface of the cushion material at the side of the seat structure member opposite to the seating side,
   wherein the cover member is adhesively fixed to the surface of the cushion material while covering the air flow passage, and allows the air flow passage to communicate with a fan device to feed air discharged from the fan device to an occupant via the air flow passage, and
   wherein the cushion material is a foamed resin and provided with a recess portion which is positioned around the air flow passage, the cover member is fixed to the surface of the cushion material with an adhesive in the recess portion, and at least the recess portion is covered by a rear surface material made of cloth, and
   wherein the foamed resin of the cushion material is impregnated within the rear surface material such that the rear surface material is adhered to the cushion material.

* * * * *